Patented Nov. 5, 1946

2,410,414

UNITED STATES PATENT OFFICE 2,410,414

ADHESIVE COMPOSITION

Charles William Johnson, New Brunswick, N. J., assignor to E. I. du Pont de Nemours & Company, Wilmington, Del., a corporation of Delaware No Drawing. Application August 17, 1943, Serial No. 498,981

8 Claims. (Cl. 20—89)

This invention relates to improved polyvinyl acetal resins and to the use of such resins in adhesive compositions, particularly when employed in the manufacture of plywood.

Polyvinyl acetal resins are of considerable commercial utility in several fields but in certain applications, their use is limited because of the solubility of the resins in organic solvents such as acetone, toluene and alcohol. When used as adhesives in the bonding of wood veneer to form plywood structures, polyvinyl acetal resins are somewhat deficient in water resistance and also may allow undesirable slippage of the plywood laminae at elevated temperatures. Shear strength of plywood prepared from previously available adhesives containing polyvinyl acetal resins on exposure to hot water or elevated temperatures does not meet certain important requirements, particularly when the plywood structures are employed in the construction of aircraft.

The present invention extends the utility of polyvinyl acetal resins by overcoming the several defects in this type of resin as heretofore available by a treatment that is both simple and effective in providing uniformly improved results.

This invention has as a primary object improved polyvinyl acetal resin coatings and adhesives which are characterized by greater water resistance and which are less soluble in organic solvents. Another object is the provision of a process for insolubilizing and otherwise improving polyvinyl acetal resins which is simple and uniformly effective. Another object of the invention is the provision of modified polyvinyl acetal resins which have improved adhesive or cementing properties as shown by higher dry and wet shear strengths when two surfaces are joined with adhesive compositions containing the modified resins. A further object is the provision of a process for laminating plywood which is particularly adapted for the manufacture of molded plywood. A still further object of the invention is the provision of improved plywood structures which must withstand weathering. Other objects will become apparent as the description of the invention proceeds.

These objects are accomplished by the addition to polyvinyl acetal resins or compositions containing such resins of a small amount of a complex compound of the Werner type in which a trivalent nuclear chromium atom is coordinated with a cyclic or an acyclic carboxylic acido group having at least ten carbon atoms, and for best results heating the resin or composition containing the resin after it has been applied to a surface as a coating or after coated surfaces are held in contiguous relationship under pressure if used as an adhesive.

According to the Werner theory, atoms may exert auxiliary valences as well as the principal valences occurring in simple compounds. These auxiliary valences may act to hold various groups to the atoms exerting them, and the atom exerting the principal and auxiliary valances may become the nuclear atom of a complex compound or complex ion.

With particular reference to chromium it has been found that the total number of groups which may be held within the complex by the combined principal and auxiliary valences is six. The groups so held are referred to as "coordinated groups" and chromium is said to have a "coordination number" of six. Other groups may also be associated with the chromium, but when this is the case such additional groups are present as ions and are outside of the chromi-nuclear complex. Moreover, there may be more than one chromi-nuclear atom within the complex, the chromium atoms being linked together by reason of being coordinated through common groups known as bridging groups. With respect to each chromium atom, each bridging group occupies but a single coordination position, so that an additional five coordination groups may be present on the atom.

The preparation and general description of Werner complexes of this type are included in U. S. Patents 2,273,040 and 2,356,161, granted to Ralph K. Iler on February 17, 1942, and August 22, 1944, respectively. In the present invention, stearato chromic chloride and stearato chromic acetate which are typical of the compounds described by Iler have given excellent results.

The following examples are given by way of illustration only and no limitations are intended thereby except as indicated in the appended claims:

*Example I*

| | Per cent by weight |
|---|---|
| Polyvinyl butyral resin (low viscosity) | 13.1 |
| Polyvinyl butyral resin (high viscosity) | 5.6 |
| Denatured ethyl alcohol (23A) | 72.2 |
| Butyl acetate | 6.0 |
| Stearato chromic chloride solution | 3.1 |
| | 100.0 |

The polyvinyl butyral resin of this example may be prepared by any of the methods well known in the art, for example, by treating polyvinyl acetate with a hydrolyzing agent such as sulfuric acid followed by condensation with butyraldehyde to give a solid, fusible resin soluble in certain organic solvents. The low viscosity resin of the example had a hydroxyl content of about 20% and the high viscosity resin had a hydroxyl content of about 10%.

The stearato chromic chloride solution consisted of a 31% solution of stearato chromic chloride in isopropyl alcohol.

The composition was thinned with 23A denatured alcohol in the proportion of 5 parts of alcohol to 1 part of the resin composition and 2 brush coats applied to $\frac{1}{16}$ inch birch veneer strips 1 inch wide; on one surface for the outer plies and on both surfaces for the center ply and allowed to dry. The adhesive coated veneer strips were then laminated with the center ply in cross-grain relation to the 2 outer plies by conventional bag process, such as described in U. S. Patent 2,276,004, using an autoclave at a pressure of 50 lbs. gauge for 25 minutes at 275° F.

The plwood specimens consisting of 3 plies with center ply in cross-grain relation to the outer 2 plies were cut and tested for shear strength, both dry and after a 3 hour boil test, in accordance with the procedure described in Army-Navy Aeronautical specifications AN-NN-P-511b. The dry shear strength was 545 pounds per square inch and after the 3 hour boil test, the shear strength was 333 pounds per square inch, both results being well above the minimum requirements of 380 pounds dry shear and 290 pounds per square inch shear strength after the 3 hour boil test referred to above. Samples of the plywood were also subjected to further stringent testing consisting of a series of 10 cycles of alternate exposure to boiling water and to elevated temperatures, each cycle consisting of a 2 hour boil in water followed by a 22 hour bake at 65° C. The shear strength of the plywood at the end of this test was 495 pounds per square inch. Plywood prepared from untreated polyvinyl butyral resin showed partial delamination after the same cycle treatment.

*Example II*

| | Per cent by weight |
|---|---|
| Polyvinyl butyral resin (low viscosity) | 13.10 |
| Polyvinyl butyral resin (high viscosity) | 5.60 |
| Denatured ethyl alcohol (23A) | 74.36 |
| Butyl acetate | 6.00 |
| Stearato chromic acetate (dry) | 0.94 |
| | 100.00 |

The resins used in this example were of the same type described in Example I.

This composition which was prepared by mixing in an agitator mixer the several ingredients shown until a uniform solution was obtained was reduced with 23A denatured alcohol as in Example I and applied to birch plywood and tested in accordance with the procedure of Example I. The dry shear strength in this instance was 653 pounds per square inch and after the 3 hour boil test, the shear strength was 351 pounds per square inch. After the 10 cycle treatment previously described the shear strength was 738 pounds per square inch. Plywood prepared with an adhesive containing the same type of resin but omitting the stearato chromic acetate showed partial delamination after the 10 cycle test. Another desirable feature provided in this modification was the relatively high wood failure of 63% in the dry shear test as compared to 44% wood failure in plywood prepared from the untreated resin and a 25% wood failure after the 3 hour boil test shown by the adhesive of Example II as compared to 0% wood failure or 100% "glue line" failure for the untreated resin adhesive when subjected to the same test.

The following table affords a ready comparison of the results obtained in testing plywood laminations prepared with polyvinyl butyral resin adhesives, both with and without the modifying agents of the present invention. These results provide concrete evidence of the important improvements which have been achieved.

| | Dry shear test | | 3 hr. boil test | | Dry shear after 10 cycles, lbs. per sq. in. |
|---|---|---|---|---|---|
| | Lbs. per sq. in. | Percent wood failure | Lbs. per sq. in. | Percent wood failure | |
| Example I | 545 | | 333 | | 495 |
| Example II | 653 | 63 | 351 | 25 | 738 |
| No agent used | 510 | 44 | 281 | 0 | (¹) |

¹ Partially delaminated.

Plastic flow tests on plywood specimens prepared with the adhesive compositions shown in the table indicate that the modifying agents have an additional effect in that they definitely raise the softening point of the adhesive which is important for certain utilities such as aircraft construction and auxiliary jettison type gasoline tanks. At a temperature of 170° F., the unmodified adhesive shows plastic flow to such an extent that break tests on the plywood could not be made whereas the compositions modified with the previously described agents, while showing some plastic flow at 170° F., were vastly improved in this respect.

The modifying agents also provide important insolubilizing effects as shown when free films of the compositions are immersed in water and in organic solvents. Films approximately 1 mil thick were cast on clear glass plates from the compositions of Examples I and II and from a similar composition in which the modifying agent is omitted and heated for 90 minutes at 65° C. The films were stripped from the glass plates and specimens immersed in water and various organic solvents with the following results. In the unmodified film, blushing was observed when immersed in water and when immersed in denatured alcohol (23A), toluol, acetone and 99% ethyl acetate, films lost their identity and became gelatinous masses in from 6 to 9 seconds. However, in the case of the films prepared from Examples I and II, immersion in water was without effect and only swelling occurred without loss of film identity and with retention of considerable tensile strength when immersed in the aforementioned solvents for about 5 minutes.

The modifying agents may be used in the proportion of between about 2% and 30% by weight of the polyvinyl acetal resin although for most purposes proportions of between about 5% and 20% by weight of the polyvinyl acetal resin are quite effective in providing the desired results.

Although the stearato chromic chloride and the stearato chromic acetate are the preferred modifying agents, particularly the latter because of its less corrosive nature, other complex compounds of the Werner type in which a trivalent nuclear chromium atom is coordinated with a cyclic or an acyclic carboxylic acido group having at least 10 carbon atoms as disclosed by Iler may likewise be used. Suitable compounds of this type include rosin chromic chloride (a compound in which rosin replaces stearic acid, thus illustrating the use of abietic acid which is a cyclic acid), and similar complexes based on naphthenic, oleic, arachidic and palmitic acids.

Although some degree of improvement may be obtained in the polyvinyl acetal compositions containing the modifying agents, when dried at room temperature, more effective results are secured through the use of elevated temperatures between about 50° and 200° C., for example, about 135° C. for a period of about 25 minutes as suggested in the examples.

While the invention is exemplified with polyvinyl butyral resin, the invention is also applicable to other polyvinyl acetal resins comprising reaction products of hydrolyzed (or partially hydrolyzed) polyvinyl esters with the lower alkyl aldehydes, such as formaldehyde, acetaldehyde, propionaldehyde, butyraldehyde and valeraldehyde.

If desired, the polyvinyl acetal compositions may include suitable plasticizers such as are commonly employed with these resins, for example, dibutyl sebacate, di(methoxyethyl) sebacate, di(butoxyethyl) sebacate; phthalates such as di(methoxyethyl) phthalate, di(butoxyethyl) phthalate and the dialkyl phthalates of alcohols containing 8 or less carbon atoms; methyl phthalyl glycolate, triethylene glycolate, tricresyl phosphate, chlorinated diphenyl and oils such as raw or blown castor oil and linseed oils.

Other compatible synthetic resins such as alkyd resins, phenolics, urea-formaldehyde resins and other types of vinyl resins may be included in the present compositions.

The incorporation of the modifying agent in the polyvinyl acetal compositions offers no particular problem since the compounding may be accomplished by conventional means. The agent may be added as a dry powder to a solution of the polyvinyl acetal resin and dissolved or dispersed therein by agitation or the agent may be first dissolved in a suitable solvent such as alcohol and this solution blended with the resin solution with moderate stirring.

The compositions of this invention may be employed for diverse coating and adhesive purposes such as coating fabric, metal, wood, rubber and resin plastics, with particular adaptability for laminating cloth, paper, glass and metal (particularly for joining aluminum surfaces), as an adhesive in the manufacture of cemented shoes (more specifically in joining the outsole to the upper by the conventional solvent activation method but preferably by the high frequency electrical activation method disclosed in U. S. Reissue Patent 22,301). As previously indicated, a particularly important utility of the new compositions resides in their application as adhesives in the manufacture of flat and molded plywood. The products are quite superior for manufacturing molded plywood since adhesives heretofore available are deficient in flexibility.

Many important advantages characterize the compositions of the present invention. As previously shown, water sensitivity is greatly reduced, thus suggesting their use for the manufacture of plywood for aircraft parts and radio antenna masts which must withstand extended outdoor exposures. The unusual initial and retained flexibility of the new adhesives contributes greatly to their usefulness. The modified compositions are also characterized by a higher softening point than the same product without the added agent, thereby inhibiting delamination tendencies at elevated temperatures. The new adhesives afford higher joint strength in plywood laminations and this improvement is apparent also after stringent treatment with boiling water.

It is apparent that many widely different embodiments of this invention may be made without departing from the spirit and scope thereof, and therefore, it is not intended to be limited except as indicated in the appended claims.

I claim:

1. A resin composition comprising a homogeneous mixture of a polyvinyl acetal resin in which the hydroxyl content is between 10% and 20% and from 2 to 30 per cent thereof of an organic complex of the Werner type in which a trivalent chromium atom is coordinated with a carboxylic acido group having at least 10 carbon atoms.

2. The composition of claim 1 in which the organic complex of the Werner type is stearato chromic chloride.

3. The composition of claim 1 in which the organic complex of the Werner type is stearato chromic acetate.

4. An adhesive composition particularly adapted for joining plywood laminations, comprising a homogeneous mixture of a polyvinyl butyral resin in which the hydroxyl content is between 10% and 20% and an organic complex of the Werner type in which a trivalent chromium atom is coordinated with a carboxylic acido group having at least 10 carbon atoms, the said organic complex being present in the proportion of between 2 and 30% by weight of the polyvinyl butyral resin.

5. The composition of claim 4 in which the organic complex of the Werner type consists of stearato chromic acetate.

6. An adhesive composition particularly adapted for joining plywood laminations, comprising a homogeneous mixture of a polyvinyl butyral resin in which the hydroxyl content is between 10% and 20% and an organic complex of the Werner type in which a trivalent chromium atom is coordinated with a carboxylic acido group having at least 10 carbon atoms, the said organic complex being present in the proportion of about 20% by weight of the polyvinyl butyral resin.

7. Plywood comprising a plurality of plies of wood and between said plies an adhesive composition comprising a homogeneous mixture of a polyvinyl acetal resin in which the hydroxyl content is between 10% and 20% and from 2 to 30 per cent thereof of an organic complex of the Werner type in which a trivalent chromium atom is coordinated with a carboxylic acido group having at least 10 carbon atoms.

8. Plywood of claim 7 in which the polyvinyl acetal resin is a polyvinyl butyral resin and the said organic complex of the Werner type is stearato chromic acetate.

CHARLES WILLIAM JOHNSON.